United States Patent
Sarig (10) Patent No.: US 10,610,334 B2
(45) Date of Patent: Apr. 7, 2020

(54) ABUTMENT, COPING AND METHOD OF CONNECTING THEREOF IN A DENTAL MULTI-UNIT SYSTEM

(71) Applicant: MIS Implants Technologies Ltd., Doar-Na Misgav (IL)

(72) Inventor: Dror Sarig, Doar-Na Misgav (IL)

(73) Assignee: MIS Implants Technologies Ltd., Misgav (IL)

( * ) Notice: Subject to any disclaimer, the term of this patent is extended or adjusted under 35 U.S.C. 154(b) by 0 days.

(21) Appl. No.: 15/774,013

(22) PCT Filed: Nov. 23, 2016

(86) PCT No.: PCT/IL2016/051259
§ 371 (c)(1),
(2) Date: May 7, 2018

(87) PCT Pub. No.: WO2017/090037
PCT Pub. Date: Jun. 1, 2017

(65) Prior Publication Data
US 2018/0325633 A1  Nov. 15, 2018

(30) Foreign Application Priority Data
Nov. 26, 2015  (IL) .......................................... 242816

(51) Int. Cl.
*A61C 8/00* (2006.01)
(52) U.S. Cl.
CPC .......... *A61C 8/0074* (2013.01); *A61C 8/0001* (2013.01); *A61C 8/005* (2013.01)
(58) Field of Classification Search
CPC ..... A61C 8/0001; A61C 8/0056; A61C 8/006; A61C 8/0069; A61C 8/0074
See application file for complete search history.

(56) References Cited

U.S. PATENT DOCUMENTS

| 5,009,596 A | * | 4/1991 | Soderberg | ............ | A61C 8/0001 433/173 |
| 5,125,840 A | | 6/1992 | Dürr et al. | | |
| 5,344,457 A | * | 9/1994 | Pilliar | .................. | A61C 8/0012 433/174 |
| 5,667,384 A | | 9/1997 | Sutter et al. | | |

(Continued)

FOREIGN PATENT DOCUMENTS

| CN | 201244094 | 5/2009 |
| WO | WO 2017/090037 | 6/2017 |
| WO | WO 2018/220612 | 12/2018 |

OTHER PUBLICATIONS

International Search Report and the Written Opinion dated Oct. 16, 2018 From the International Searching Authority Re. Application No. PCT/IL2018/050502. (22 Pages).

(Continued)

*Primary Examiner* — Ralph A Lewis (57) ABSTRACT

An abutment for a dental multi-unit system is provided. The abutment comprises a coping connecting means to secure to a coping, the coping connecting means comprising a cavity extending downwards inside the abutment from a top thereof. The cavity is at least partially defined, at a top portion thereof, by an inward-tapering surface. The inward-tapering surface may comprise an internal conical surface. The cavity may further be defined, at least partially, by an internally threaded portion disposed below the inward-tapering surface. A coping configured to secure onto an abutment in a dental multi-unit system is also provided. The coping comprises an abutment connecting means comprising a frusto-conical section extending downwards in a bottom section of the coping and adjacently surrounding a through-hole through the coping. A method of securing a coping to an abutment in a dental multi-unit system is also provided.

7 Claims, 5 Drawing Sheets

SECTION A-A

(56) References Cited

U.S. PATENT DOCUMENTS

| | | | |
|---|---|---|---|
| 5,829,977 | A | 11/1998 | Rogers et al. |
| D414,556 | S | 9/1999 | Broberg et al. |
| 6,030,219 | A * | 2/2000 | Zuest .................. A61C 8/0048 433/172 |
| 6,358,050 | B1 | 3/2002 | Bergström et al. |
| 6,663,388 | B1 | 12/2003 | Schar et al. |
| D507,650 | S | 7/2005 | Teich |
| D528,210 | S | 9/2006 | Boettcher |
| D604,413 | S | 11/2009 | Ikeya et al. |
| D606,196 | S | 12/2009 | Fares et al. |
| 7,699,613 | B2 * | 4/2010 | Niznick ................ A61C 8/0001 433/174 |
| D663,032 | S | 7/2012 | Mashio et al. |
| D663,419 | S | 7/2012 | Mashio et al. |
| D733,885 | S | 7/2015 | Andersin et al. |
| D752,756 | S | 3/2016 | Aravena et al. |
| D783,823 | S | 4/2017 | Emanuelli |
| D783,825 | S | 4/2017 | Emanuelli |
| D785,179 | S | 4/2017 | Emanuelli |
| D808,016 | S | 1/2018 | Kim et al. |
| 2006/0183078 | A1 | 8/2006 | Niznick |
| 2007/0020582 | A1 | 1/2007 | Neumeyer |
| 2008/0227057 | A1 | 9/2008 | Anitua Aldecoa |
| 2009/0298013 | A1 | 12/2009 | Baruc |
| 2011/0269105 | A1 | 11/2011 | Jahn |
| 2012/0202169 | A1 | 8/2012 | Ryu et al. |
| 2014/0011160 | A1 | 1/2014 | Jorneus et al. |
| 2014/0141387 | A1 | 5/2014 | Kikuchi |
| 2014/0162212 | A1 | 6/2014 | Mullaly et al. |
| 2015/0044635 | A1 | 2/2015 | Wang |
| 2016/0270877 | A1 | 9/2016 | Richard |
| 2016/0317254 | A1 | 11/2016 | Courvoisier et al. |
| 2018/0116769 | A1 | 5/2018 | Seo et al. |
| 2018/0338818 | A1 | 11/2018 | Sarig et al. |

OTHER PUBLICATIONS

Invitation to Pay Additional Fees, Communication Relating to the Results of the Partial International Search and the Provisional Opinion dated Aug. 22, 2018 From the International Searching Authority Re. Application No. PCT/IL2018/050502. (15 Pages).

Notice of Allowance dated Oct. 4, 2018 From the US Patent and Trademark Office Re. U.S. Appl. No. 29/616,214. (19 pages).

Notice of Allowance dated Oct. 4, 2018 From the US Patent and Trademark Office Re. U.S. Appl. No. 29/616,215. (19 pages).

Notification of Reason for Rejection dated Aug. 28, 2018 From the Japanese Patent Office Re. Application No. 2018-001178.

Official Action dated Oct. 16, 2018 From the US Patent and Trademark Office Re. Translators U.S. Appl. No. 15/978,237. (22 pages).

Notification of Office Action dated Feb. 22, 2018 From the State Intellectual Property Office of the People's Republic of China Re. Application No. 201730565857.2 and Its Translation Into English.

Restriction Official Action dated Jul. 31, 2018 From the US Patent and Trademark Office Re. U.S. Appl. No. 15/978,237. (9 pages).

International Preliminary Report on Patentability dated Jun. 7, 2018 From the International Bureau of WIPO Re. Application No. PCT/IL2016/051259. (7 Pages).

International Search Report and the Written Opinion dated Mar. 20, 2017 From the International Searching Authority Re. Application No. PCT/IL2016/051259. (11 Pages).

Anthogyr "Axiom® Multi Level®—Total Compatibility Between the Bone Level and Tissue Level", Product Description, 1 P., Oct. 3, 2016.

Advisory Action Before the Filing of an Appeal Brief dated Jun. 14, 2019 From the US Patent and Trademark Office Re. U.S. Appl. No. 15/978,237. (4 Pages).

Application-Initiated Interview Summary dated May 31, 2019 From the US Patent and Trademark Office Re. U.S. Appl. No. 15/978,237. (4 Pages).

Official Action dated Mar. 26, 2019 From the US Patent and Trademark Office Re. U.S. Appl. No. 15/978,237. (23 pages).

Written Opinion dated May 17, 2019 From the International Preliminary Examining Authority Re. Application No. PCT/IL2018/050502. (8 Pages).

Office Action dated Jun. 30, 2019 From the Israel Patent Office Re. Application No. 242816 and Its Translation Into English. (7 Pages).

Official Action dated Jul. 18, 2019 From the US Patent and Trademark Office Re. U.S. Appl. No. 15/978,237. (17 pages).

* cited by examiner

ABUTMENT, COPING AND METHOD OF CONNECTING THEREOF IN A DENTAL MULTI-UNIT SYSTEM

RELATED APPLICATIONS

This application is a National Phase of PCT Patent Application No. PCT/IL2016/051259 having International filing date of Nov. 23, 2016, which claims the benefit of priority of Israel Patent Application No. 242816 filed on Nov. 26, 2015. The contents of the above applications are all incorporated by reference as if fully set forth herein in their entirety.

FIELD OF THE INVENTION

The invention, in some embodiments, relates to the field of dental multi-unit systems and more particularly, but not exclusively, to abutments and copings configured to be secured together in a dental multi-unit system.

BACKGROUND OF THE INVENTION

Dental multi-unit implant systems are known in the art for use as anchoring members for dental prosthetics. A multi-unit system (herein abbreviating "dental multi-unit implant system" or "dental multi-unit system") may include a dental implant, having a threaded portion typically threaded into a bore, which is drilled into the patient's mandible or maxilla; a dental abutment, anchored onto the implant; and a coping anchored onto the abutment. A specific multi-unit system may be composed so as to adapt to a specific patient, using an implant, an abutment and a coping, each being selected from a respective series to optimally fit to the patient's anatomy and other specifics of the dental procedure that is carried out.

Figure 1:
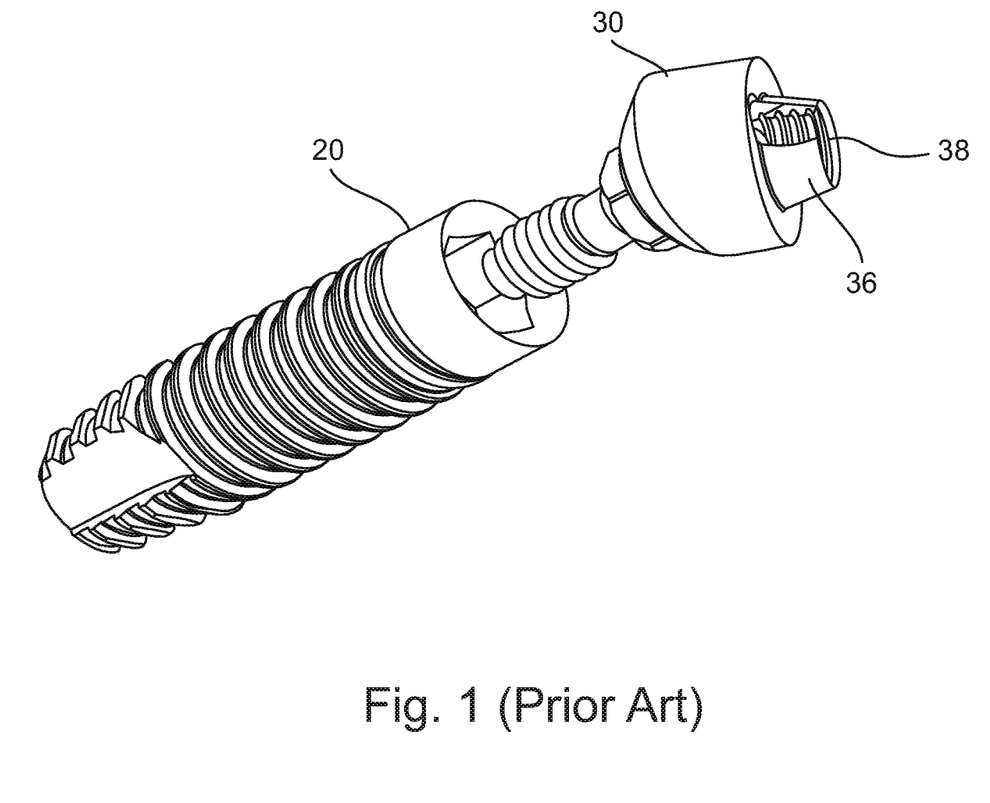
FIG. 1 schematically depicts a dental implant and an abutment of the prior art.

US patent application publication number 2009/0298013 discloses an abutment assembly device comprising an abutment for supporting a dental prosthesis. FIG. 1 schematically depicts an implant 20 and an abutment 30 of the prior art. The abutment 30 includes a protruding flange 36 in a form of a cone-section, configured to receive a prosthesis or a coping thereon, and a threaded bore 38 extending in the cone section. A coping or a prosthesis (not shown) configured to attach over the abutment may include a frusto-conical or tapered cavity for receiving the cone portion 36 of the abutment 30 therein, such that the coping closely mates with the cone portion 36.

SUMMARY OF THE INVENTION

Aspects of the invention, in some embodiments thereof, relate to dental multi-unit systems. More specifically, aspects of the invention, in some embodiments thereof, relate to abutments and copings configured to be secured together in a dental multi-unit system.

As discussed above, known multi-unit systems provide a coping, and an abutment configured to secure to the coping, wherein the abutment comprises a cone section and the coping comprises a frusto-conical or tapered cavity. The coping is configured to anchor onto the abutment by entering the cone-section of the abutment into the tapered cavity of the coping.

It is noted that in existing multi-unit systems, the length of the cone section that enters the cavity exceeds 1 mm, and in many systems even reaches 3 mm, to ensure a mechanically stable and reliable connection between the coping and the abutment. However, a connection involving a cone section in the abutment that extends into an anchored coping is far from optimal, because such connection implies sever restrictions and constraints on the configuration of the multi-unit system in general and the coping in particular. For example, the coping must generally be larger than the cone section and therefore must typically be longer than 3 mm. In addition, employment of such a multi-unit system may be restricted, impeded or inhibited due to lack of sufficient space in a situation where the abutment must be positioned in the patient's mouth at an angle relative to neighboring teeth. Implantation in between two existing teeth may also be restricted or inhibited in some situations for similar reasons.

An abutment having a cavity in a top portion thereof, configured to receive an extension of a coping extending downwards in a bottom portion thereof, may therefore enable a more compact abutment, a more compact coping, a more compact multi-unit system, and consequently greater flexibility in using such a multi-unit system in implantation procedures.

There is thus provided according to an aspect of some embodiments an abutment for a dental multi-unit system. The abutment comprises a coping connecting means to secure to a coping; the coping connecting means comprises a cavity extending downwards inside the abutment from a top of the abutment, the cavity being at least partially defined by an inward-tapering surface. According to some embodiments, the inward-tapering surface comprises an internal conical surface.

According to some embodiments, the abutment further comprises a bottom portion comprising an implant connecting means for connecting onto a dental implant, a median portion above the bottom portion and a top portion above the median portion. The top portion comprises an external conical section, and the inward-tapering surface extends downwards through the top portion into the median portion. According to some embodiments, the external conical section extends upwards to a height C, C being smaller than 1 mm.

According to a further aspect of some embodiments there is provided a coping for a dental multi-unit system, configured to secure onto an abutment. The coping comprises an abutment connecting means comprising a frusto-conical section extending downwards in a bottom section of the coping and adjacently surrounding a through-hole through the coping.

This invention thus separately provides an abutment and a coping of a multi-unit system that can be secured to one another in a rigid, stable, properly aligned and reliable connection, and the coping may be shorter than 3 mm, or shorter than about 2 mm, and even shorter than about 1 mm. According to some embodiments, the coping comprises a frusto-conical section extending downwards in a bottom section thereof, that enters into the cavity at the top of the abutment when the coping is connected to the abutment. According to some embodiments, the frusto-conical section enters into the cavity to a depth of more than 2 mm, thereby providing sufficient mechanical strength and stability to the connection between the abutment and the coping. According to some embodiments, the abutment comprises an external conical section that extends to a height of only 0.5 mm into the coping, thus defining a compact, low-profile abutment and implying a considerably lesser constraint on the length of the coping, compared to abutments and copings of existing techniques.

In use, an implant and an abutment of the multi-unit system of the invention may be implanted so that only the external conical section of the abutment extends out from the intended soft-tissue (gingiva) level. In other words, when a multi-unit system of the invention is used, only a portion of the abutment having a length of about 0.5 mm may extend out from the gingiva into the mouth. Following implantation and during the healing phase, as the gingiva around the implant heal, such a minute extension of a portion of the abutment into the mouth minimizes disturbances to the tongue, and assists in expediting the healing process. Furthermore, the low-profile abutment (namely the minute extension of the abutment into the mouth) enables selecting low-profile copings —namely short copings—when the anatomy dictates such a selection, thereby enhancing the quality of the restoration procedure.

Certain embodiments of the present invention may include some, all, or none of the above advantages. Further advantages may be readily apparent to those skilled in the art from the figures, descriptions, and claims included herein. Aspects and embodiments of the invention are further described in the specification hereinbelow and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE SEVERAL VIEWS OF THE DRAWING(S)

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the drawings.

DETAILED DESCRIPTION OF SOME EMBODIMENTS

The principles, uses and implementations of the teachings herein may be better understood with reference to the accompanying description and figures. Upon perusal of the description and figures present herein, one skilled in the art is able to implement the teachings herein without undue effort or experimentation. In the figures, like reference numerals refer to like parts throughout.

Figure 2:
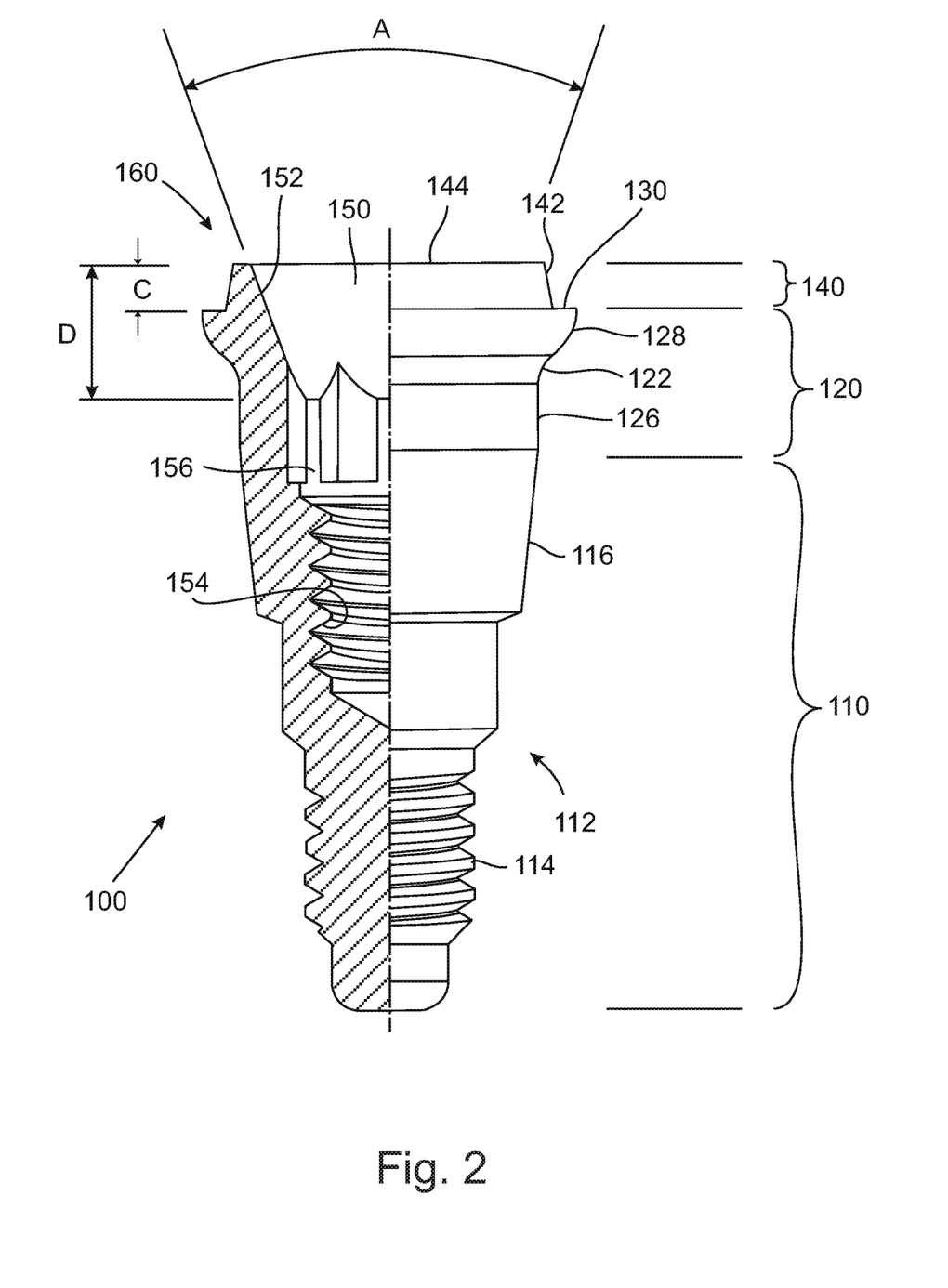
FIG. 2 schematically depicts, in half cross-section, half side view, an embodiment of an abutment configured to secure to a dental implant and to a coping, according to the teachings herein.

FIG. 2 schematically illustrates an abutment 100 configured to secure to a dental implant and to a coping (both are not shown here), for use in a dental restoration, according to an aspect of some embodiments, in a half cross-section, half side view. Abutment 100 may be a unitary member formed of a biocompatible material, such as titanium or stainless steel for example.

Abutment 100 comprises a bottom portion 110 comprising an implant connecting means 112 for securing to a dental implant. According to some embodiments, implant connecting means 112 comprises an externally threaded portion 114 for threadably engaging with an implant, as is further described below, and a conical section 116 disposed above externally threaded portion 114.

Abutment 100 further comprises a median portion 120 extending above bottom portion 120 and having a length H. On an external surface 122 thereof, median portion 120 comprises a cylindrical section 126 above conical section 116, and a tapered section 128 directly above the cylindrical section. Tapered section 128 widens towards a shoulder 130 at a top of median section 120.

Abutment 100 further comprises a top portion 140, comprising an external conical section 142. External conical section 142 extends upwards to a height C from shoulder 130 to a top thereof 144, narrowing towards the top 144. According to some embodiments, height C may be smaller than about 1 mm or even smaller than about 0.8 mm. According to some embodiments C may be zero, in other words an abutment of the invention may not comprise an external conical section at all.

Abutment 100 further comprises a cavity 150 extending downwards from top 144 through top portion 140 into median portion 120. Cavity 150 is at least partially defined by an internal conical surface 152 tapering inwards and extending downwards from top 144 into median portion 120 to a depth D. Generally, the depth D dictates or at least strongly affects a strength of connection between abutment 100 and a fitting coping as is further detailed and explained below. According to the invention, D is greater than C. According to some embodiments, depth D may be greater than twice height C. Internal conical surface 152 is characterized according to some embodiments by a cone angle A between about 30 and 50 degrees, and preferably of about 40 degrees.

Cavity 150 is further defined by an internally threaded portion 154 disposed below internal conical surface 152. According to some embodiments external conical section 142 together with internal conical surface 152 and internally threaded portion 154 form a coping connecting means 160, configured to attach to a coping according to the teachings herein. According to some embodiments, coping connecting means 160 further comprise shoulder 130.

According to some embodiments, a non-circular anti-rotation configuration 156 defines a median portion of cavity 150, between internal conical surface 152 and threaded portion 154. Non-circular anti-rotation configuration 156 may include a polygonal or non-circular contour (e.g., hex Socket (Allen), Torx (T and TX, TR), square, double square etc.), which is tapered to allow for unirotational location (keyway configuration) or multi-location (polygonal configuration). The non-circular contour of the surface of median portion 156 provides an anti-rotation feature that may be used for rotating abutment 100 using a suitable key (e.g. a hex (Allen) key, a Torx key a square key a double square key etc.), e.g. for securing abutment 100 onto an implant. Additionally or alternatively the non-circular contour of the surface of median portion 156 may be used for preventing rotation relative to the abutment of a coping such as a prosthetic device after securing onto the abutment.

Figure 3:
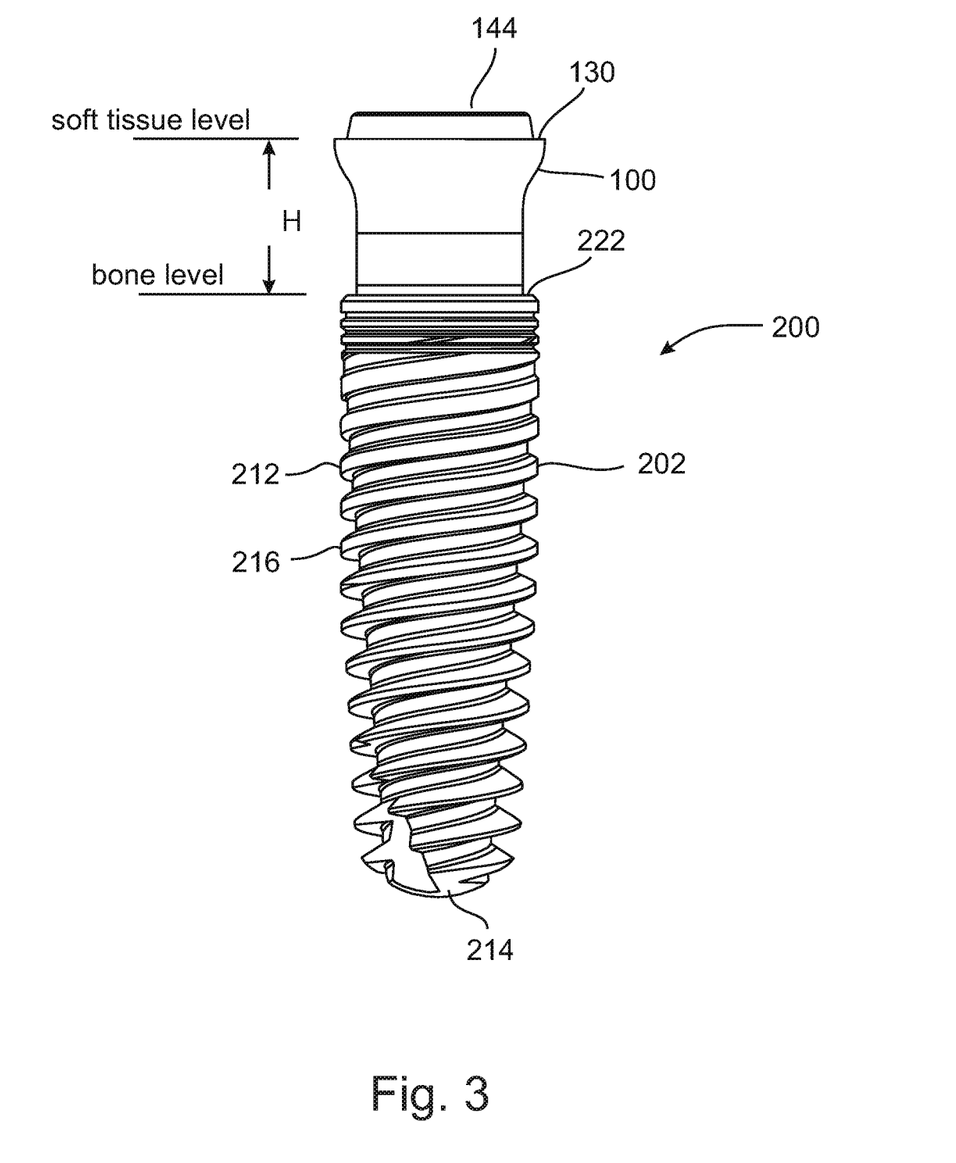
FIG. 3 schematically depicts in a side view an implant system comprising the abutment of FIG. 2 secured to an implant.

FIG. 3 schematically depicts an implant system 200 comprising abutment 100 secured to an implant 202 in a side view. Implant 202 includes a cavity (not shown here) extending into the implant from a top end 222 of implant 202. The central axis of the cavity may be co-axial with the central longitudinal axis of the implant. The cavity is configured to receive therein, at least partially, bottom portion 110 of abutment 100, for engaging implant 202 with implant connecting means 112 of abutment 100. Specifically, an internally threaded portion in the cavity of the implant may be configured for threadably engaging with externally threaded portion 114 of abutment 100 to secure abutment 100 to implant 202.

When implant system 200 is used in a dental implantation procedure, implant 202 and abutment 100 may be selected from a series of implants and from a series of abutments, respectively, to compose an optimum implant system 200 according to anatomy characteristics and other characteristics of the patient. For example, implant 202 may be selected to have dimensions—e.g. length and width—according to the bone density and other factors of the implantation region. Further, abutment 100 may be selected to have dimensions—e.g. length—according to the width of the soft tissue (e.g. gingiva) around the bone. In use, when dental implant 202 is implanted, the top 222 of implant 202 is, according to some embodiments, intended to align at about the bone level of the implantation region. Further, shoulder 130 is indented, according to some embodiments, to be aligned at about the soft tissue level of the implantation region. That is to say, that in some implementations median portion 120 is substantially or mostly inside the soft tissue, and top portion 140, and particularly external conical section 142, substantially or mostly extends out from the soft tissue.

Figure 4A:
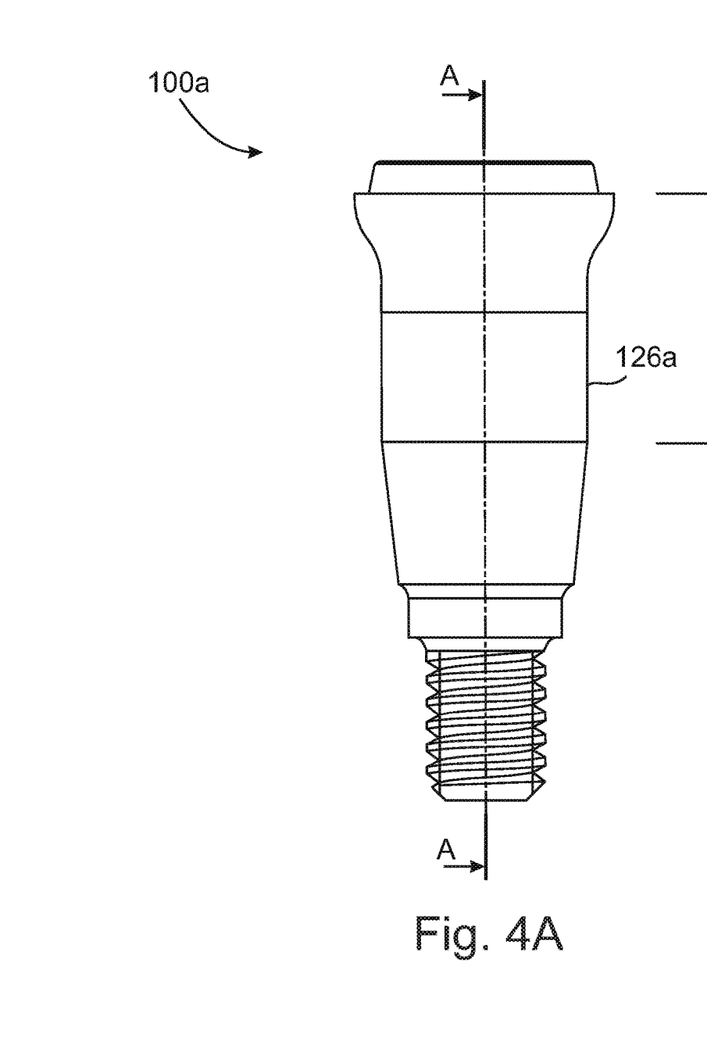
FIG. 4A schematically depicts in a side view an embodiment of an abutment different from the abutment of FIG. 2 by having a longer median portion.
Figure 4B:
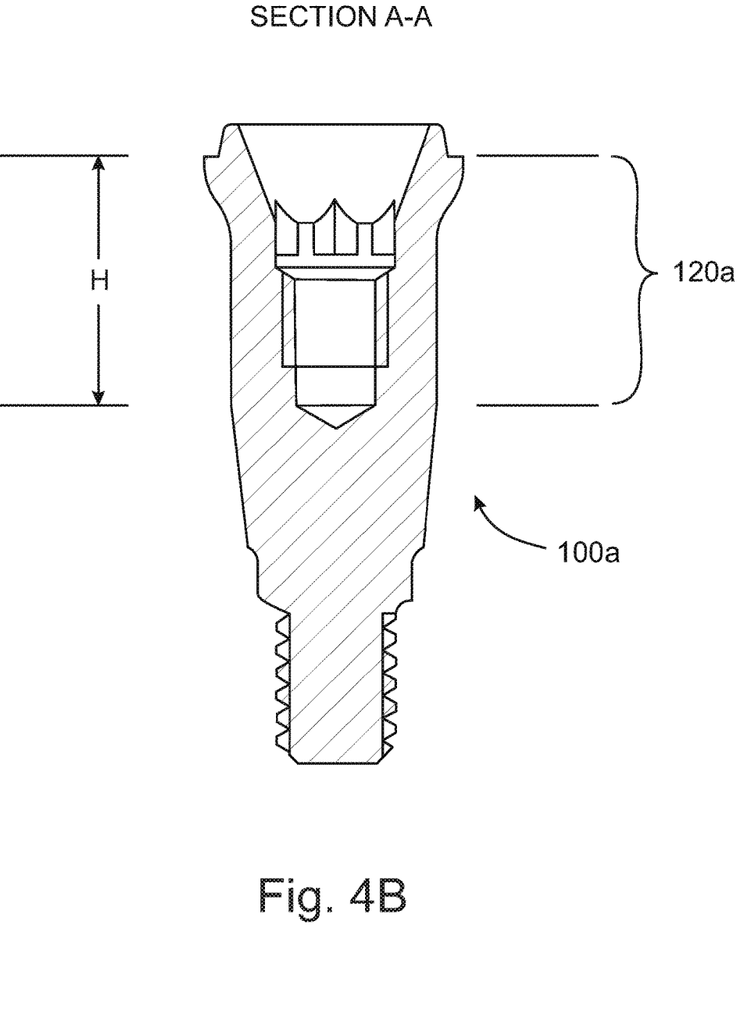
FIG. 4B schematically depicts in a cross-sectional view along plane A-A of the abutment of FIG. 4A.

FIGS. 4A and 4B schematically depict, is a side view and in a cross-sectional view, respectively, an abutment 100a configured to be used with implant 202 and having a longer median portion 120a (due to a longer cylindrical section 126a) compared to the median portion 120 of abutment 100 of FIGS. 2 and 3. Thus, abutment 100a may be used for implantation in an implantation region having a thicker soft tissue compared to the thickness of the soft tissue for which the implant system 200 with abutment 100 is optimized. According to some embodiments, abutments from a series of abutments of the invention may have lengths H in a range between about 1.5 mm to 8 mm. According to some embodiments, median portion lengths H may vary in a series of abutments in increments of about 0.5 mm. According to some embodiments a length of the bottom portion 110 may be about 6 mm.

Figure 5A:
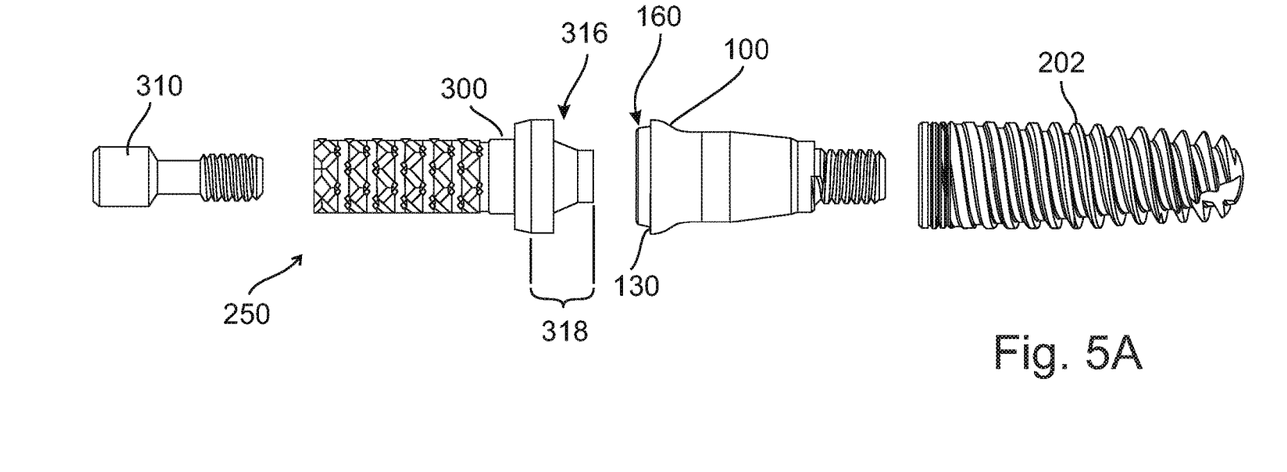
FIG. 5A schematically depicts, in an exploded view, a multi-unit system comprising the implant and abutment depicted in FIG. 3 and a coping configured to be secured to the abutment by a fastener, and FIG. 5B schematically depicts in a half cross-section, half side view the multi-unit system of FIG. 5A in a secured state.
Figure 5B:
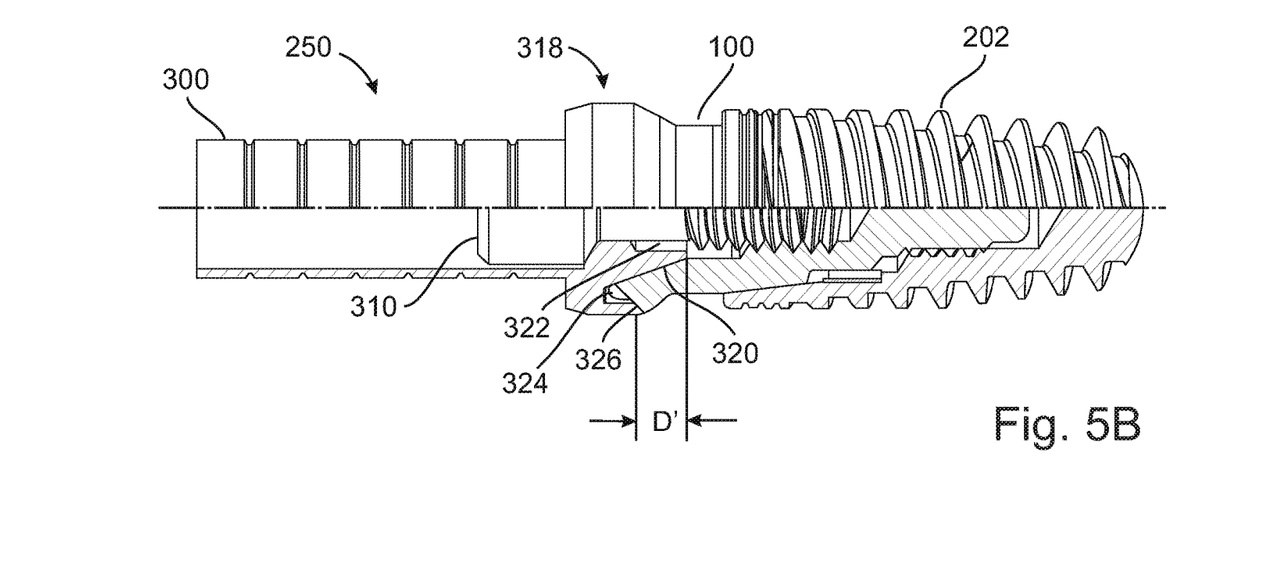

FIG. 5A schematically depicts an exploded view of a multi-unit system 250 comprising implant 202, abutment 100 and a coping 300 configured to be secured to abutment 100 by a fastener 310. FIG. 5B schematically depicts a half cross-section, half side view of multi-unit system 250 in a secured state, that is to say abutment 100 being secured implant 202 and coping 300 being secured to abutment 100. Coping 300 comprises an abutment connecting means 316 in a bottom portion 318 thereof, comprising a frusto-conical section 320, adjacently surrounding a through-hole 322 that extends along the longitudinal axis of the coping and configured for the passage of fastener 310 there through. Frusto-conical section 320 extends downwards from a ditch 324, ditch 324 being descended between the frusto-conical section 320 and a coping shoulder 326. Accordingly, coping shoulder 326 surrounds, preferably co-axially, ditch 324, and ditch 324 surrounds, preferably co-axially, frusto-conical section 320. Frusto-conical section 320 has preferably the same cone angle A of internal conical surface 152. According to some embodiments, A may be between 30 and 50 degrees and may preferably be equal to about 40 degrees. Frusto-conical section 320 extends downwards from ditch 324 to a length D' D' being about the size of D.

According to some embodiments, the inward tapering and the preferred cone shape of the top portion of cavity 150 allows securing to the abutment of the invention a coping even when the abutment is not parallel to the neighboring teeth or to neighboring implants. Cone angle A between 30 and 50 degrees, e.g. an angle of 40 degrees, for the internal conical surface 152 and for external conical section 142, enables installing copings of the invention on the dental systems of FIG. 3 without requiring modifications to the coping connecting means 160 and/or to the abutment connecting means 316, and particularly without requiring an undercut in any of the coping nor the abutment.

When a coping such as coping 300 (e.g. having abutment connecting means 316) is secured onto abutment 100, coping connecting means 160 and abutment connecting means 316 stabilize the coping relative to the abutment. When the coping is disposed onto abutment 100, frusto-conical section 320 enters into cavity 150 and closely interfaces internal conical surface 152. Further, external conical section 142 enters into ditch 324. Two surfaces are said herein to closely interface meaning that the two surfaces contact, and preferably contact tangentially. The lengths D and D', along which internal conical surface 152 interfaces closely frusto-conical section 320, respectively, determine a mechanical strength of the connection between the coping and the abutment. In other words, the larger D and D', the stronger the attachment of coping 310 to abutment 100 when fastener 310 is fastened. Securing the coping onto the abutment using, e.g. fastener 310, fastens the coping onto the abutment until coping shoulder 326 is supported by shoulder 130 of abutment 100, thereby stabilizing the coping relative to abutment 100 and aligning the longitudinal axis of the abutment with the longitudinal axis of the coping.

There is thus provided according to an aspect of some embodiments an abutment (100, 100a) for a dental multi-unit system (250) configured to secure onto a dental implant (202) (numerals herein are provided in parentheses to indicate that the associated items are mentioned as non-limiting examples of the description). The abutment comprises a coping connecting means (160) to secure to a coping; the coping connecting means comprises a cavity (150) extending downwards inside the abutment from a top (144) thereof, the cavity being at least partially defined by an inward-tapering surface (152). According to some embodiments, the inward-tapering surface comprises an internal conical surface. According to some embodiments, the cavity is further defined, at least partially, by an internally threaded portion (154) disposed below the inward-tapering surface.

According to some embodiments, the abutment further comprises a bottom portion (110) comprising an implant connecting means (112) for connecting onto the dental implant (202), and a median portion (120) above the bottom portion. According to some embodiments, the abutment further comprises a top portion (140) above the median portion. The top portion comprising an external conical section (142), whereas the inward-tapering surface extends downwards through the top portion into the median portion.

According to some embodiments, the external conical section extends upwards to a height C, C being smaller than 1 mm. According to some embodiments, the external conical section extends upwards to a height C, and the inward-tapering surface extends downwards to a depth D, and 2C<D. According to some embodiments, the external conical section extends upwards from a shoulder (130) circumventing the external conical section.

There is further provided according to an aspect of some embodiments a coping (300) configured to secure onto an abutment. The coping comprises an abutment connecting means (316) comprising a frusto-conical section (320) extending downwards in a bottom section of the coping and adjacently surrounding a through-hole (322) through the coping. According to some embodiments, the abutment connecting means further comprises a coping shoulder (326) circumventing the frusto-conical section, the frusto-conical section extending downwards beyond (namely lower than—) the coping shoulder. According to some embodiments, the abutment connecting means further comprises a ditch (324) descended between the frusto-conical section and the coping shoulder.

There is further provided according to an aspect of some embodiments a dental multi-unit system (250) comprising an abutment and a coping secured to the abutment by a fastener (310). According to some embodiments, the shoulder of the coping is supported by the shoulder of the abutment when the coping is secured to the abutment, thereby stabilizing the coping relative to the abutment and aligning the longitudinal axis of the abutment with the longitudinal axis of the coping. According to some embodiments, the dental multi-unit system further comprises a dental implant (202) to which the abutment is secured.

There is yet further provided according to an aspect of some embodiments a method of securing a coping (300) to an abutment (100) in a dental multi-unit system (250). The method comprises inserting a frusto-conical section (320) extending downwards in a bottom section of the coping and adjacently surrounding a through-hole (322) through the coping, into a cavity (150) in the abutment, the cavity extending inside the abutment from a top (144) of the abutment downwards. According to some embodiments, the method further comprises fastening the coping to the abutment using a fastener (310) that passes through the through-hole of the coping.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although steps of methods according to some embodiments may be described in a specific sequence, methods of the invention may comprise some or all of the described steps carried out in a different order. A method of the invention may comprise all of the steps described or only a few of the described steps. No particular step in a disclosed method is to be considered an essential step of that method, unless explicitly specified as such.

Although the invention is described in conjunction with specific embodiments thereof, it is evident that numerous alternatives, modifications and variations that are apparent to those skilled in the art may exist. Accordingly, the invention embraces all such alternatives, modifications and variations that fall within the scope of the appended claims. It is to be understood that the invention is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the invention. Section headings are used herein to ease understanding of the specification and should not be construed as necessarily limiting.

What is claimed is:

1. An abutment for a dental multi-unit system configured to secure onto a dental implant, said abutment comprising a top portion comprising a coping connector to secure to a coping, said coping connector comprises a cavity extending downwards inside said abutment from a top thereof, said cavity being at least partially defined by an inward-tapering surface and an internally threaded portion; said inward-tapering surface extends downwards at least 20% of the total length of said cavity;
   said coping connector comprises a non-circular anti-rotation configuration to prevent rotation of said coping relative to said abutment; said non-circular anti-rotation configuration located below said inward-tapering surface and above said internally threaded portion;
   said abutment comprising a bottom portion comprising an implant connector comprising an externally threaded portion for threadably engaging with said implant.

2. The abutment of claim 1, wherein said abutment further comprises a bottom portion comprising said implant connector for connecting onto said dental implant, a median portion above said bottom portion and a top portion above said median portion, wherein said top portion comprises an external conical section, and said inward-tapering surface extends downwards through said top portion into said median portion.

3. The abutment of claim 2 wherein said external conical section extends upwards from said top portion to a height smaller than about 1 mm.

4. The abutment of claim 2 wherein said external conical section extends upwards from a shoulder located at said top and circumventing said external conical section.

5. The abutment of claim 1 wherein said inward-tapering surface comprises an internal conical surface.

6. The abutment of claim 5 wherein said internal conical surface has a cone angle between 30 and 50 degree.

7. A dental multi-unit system comprising:
   an abutment for a dental multi-unit system configured to secure onto a dental implant, said abutment comprising a top portion comprising a coping connector to secure to a coping, said coping connector comprises a cavity extending downwards inside said abutment from a top thereof, said cavity being at least partially defined by an inward-tapering surface and an internally threaded portion; said inward-tapering surface extends downwards at least 20% of the total length of said cavity; said coping connector comprises a non-circular anti-rotation configuration to prevent rotation of said coping relative to said abutment; said non-circular anti-rotation configuration located below said inward-tapering surface and above said internally threaded portion; said abutment further comprising a bottom portion comprising an implant connector comprising an externally threaded portion for threadably engaging with said implant;

a coping configured to secure onto said abutment, comprising an abutment connector comprising a frusto-conical section extending downwards in a bottom section of said coping adjacently surrounding a through-hole through said coping, said frusto-conical section being dimensioned to enter into said cavity of said abutment for securing said coping onto said abutment; said abutment connector further comprises a coping shoulder circumventing said frusto-conical section, said frusto-conical section extending downwards beyond said coping shoulder; said through-hole configured for the passage of a fastener therethrough; and a dental implant comprising a cavity extending into said implant from a top end of said implant; said cavity comprising an internally threaded portion configured for threadably engaging said externally threaded portion of said implant connector of said abutment.

* * * * *